United States Patent [19]

Frederick

[11] Patent Number: 5,696,857
[45] Date of Patent: Dec. 9, 1997

[54] WDM/FDM FIBER OPTIC SENSOR ARCHITECTURE USING WDM TAP COUPLER

[75] Inventor: Donald A. Frederick, Woodland Hills, Calif.

[73] Assignee: Litton Systems, Inc., Woodland Hills, Calif.

[21] Appl. No.: 686,988

[22] Filed: Jul. 25, 1996

[51] Int. Cl.$^6$ ............................................. G02B 6/04
[52] U.S. Cl. ....................................... 385/12; 385/24
[58] Field of Search ........................... 385/12, 13, 24, 385/45, 46; 356/345, 349

[56] References Cited

U.S. PATENT DOCUMENTS

| | | | |
|---|---|---|---|
| H1436 | 5/1995 | Kersey et al. | 356/345 |
| 4,632,551 | 12/1986 | Pavlath | 356/345 |
| 4,789,241 | 12/1988 | Michal et al. | 356/350 |
| 4,848,906 | 7/1989 | Layton | 356/345 |
| 5,394,377 | 2/1995 | vonBieren | 367/149 |
| 5,396,568 | 3/1995 | Reed et al. | 385/13 |
| 5,475,216 | 12/1995 | Danver et al. | 250/227.1 |
| 5,497,233 | 3/1996 | Meyer | 356/345 |
| 5,504,720 | 4/1996 | Meyer et al. | 367/149 |
| 5,555,086 | 9/1996 | vonBieren et al. | 356/345 |

*Primary Examiner*—John Ngo
*Attorney, Agent, or Firm*—Lynn & Lynn

[57] ABSTRACT

A fiber optic sensor comprises a first optical signal source that produces an optical signal of wavelength $\lambda_1$ and a second optical signal source that produces an optical signal of wavelength $\lambda_2$. A first WDM coupler is connected to the first and second optical signal sources to combine signals output therefrom. An optical fiber is connected to the WDM coupler to guide the combined optical signals therefrom. A second WDM coupler is connected to the optical fiber to separate the optical signals of wavelength $\lambda_1$ and $\lambda_2$. A fiber optic sensor array containing a plurality of fiber optic sensors is connected to the second WDM coupler and arranged such that optical signals of the wavelengths $\lambda_1$ and $\lambda_2$ are directed to different fiber optic sensors in the fiber optic sensor array. A third WDM coupler is arranged for combining signals of wavelength $\lambda_1$ and $\lambda_2$ output from the fiber optic sensor array. FDM multiplexing apparatus is connected to the third WDM coupler apparatus. Demultiplexing and demodulating apparatus is connected to the FDM multiplexing apparatus for producing output signals corresponding to the fiber optic sensors.

5 Claims, 2 Drawing Sheets

WDM/FDM FIBER OPTIC SENSOR ARCHITECTURE USING WDM TAP COUPLER

BACKGROUND OF THE INVENTION

This invention relates generally to optical fiber sensing systems and particularly to optical fiber sensing systems that include return telemetry couplers for coupling signals from a sensor onto a return telemetry line.

The methods commonly used to multiplex many channels of fiber optic sensor data together on a single optical fiber are to divide the signals among several modulation carrier frequencies by frequency division multiplexing (FDM), dividing the signals among several optical wavelengths by wavelength division multiplexing (WDM), or dividing the signals over several time periods by time division multiplexing (TDM). Another type of multiplexing is coherence multiplexing.

With FDM a broad range of subcarrier modulation frequencies can be easily generated and imposed on a series of continuous wave, free running laser sources. Demultiplexing is accomplished by relatively simple electronics. Its fundamental architectural requirements are to have a separate input line to the array for each source modulation frequency, and to have no more than one of each of these carrier frequencies on any one return line from the array. For example, a 500 channel array where each of 25 lasers drives 20 sensors would need a separate input line for each laser and a return line for each of the sensors it drives. This creates a requirement for an optical fiber connector with at least 45 pins. The number of laser signals on a return line will also regulate the noise performance of large FDM systems, with shot noise rising as the square root of the number of (balanced) optical signals falling on a single detector. Therefore, large systems require more optical power to produce a given signal-to-noise ratio.

A typical FDM sensor telemetry array uses four optical sources (usually lasers) and four optical receivers to address 16 sensors. Each of the lasers is modulated at a unique carrier frequency. Each of the four return telemetry fibers bears one signal from each of the lasers. Each receiver can then discriminate among the four sensor signals on a return fiber with filters tuned to the unique carrier modulation frequencies of the optical sources used to address the individual sensors.

Wavelength division multiplexers are integrated fiber devices, available commercially from many vendors. Typically they display near 100% coupling between the fibers at one wavelength, and near zero coupling at another.

SUMMARY OF THE INVENTION

A fiber optic sensor system according to the present invention optimizes optical power returned to the detector for two-color WDM/FDM arrays. Present indications are that WDM couplers can be used economically in two-color WDM/FDM systems to approximately double the optical power returned from the sensors which limit the system power budget.

A fiber optic sensor system according to the present invention comprises a first optical signal source that produces an optical signal of wavelength $\lambda_1$ and a second optical signal source that produces an optical signal of wavelength $\lambda_2$. A first WDM coupler is connected to the first and second optical signal sources to combine signals output therefrom. An optical fiber is connected to the WDM coupler to guide the combined optical signals therefrom. A second WDM coupler is connected to the optical fiber to separate the optical signals of wavelength $\lambda_1$ and $\lambda_2$. A fiber optic sensor array containing a plurality of fiber optic sensors is connected to the second WDM coupler and arranged such that optical signals of the wavelengths $\lambda_1$ and $\lambda_2$ are directed to different fiber optic sensors in the fiber optic sensor array. A third WDM coupler is arranged for combining signals of wavelength $\lambda_1$ and $\lambda_2$ output from the fiber optic sensor array.

The fiber optic sensor system according to the present invention preferably further comprises FDM multiplexing apparatus connected to the third WDM coupler apparatus, optical receiver apparatus is connected to the FDM multiplexing apparatus and demultiplexing and demodulating apparatus is connected to the optical receiver for producing output signals corresponding to the fiber optic sensors.

The WDM couplers preferably are formed to provide 100% exchange of optical signals between optical fibers at a first wavelength and 0% coupling at a second wavelength.

The fiber optic sensor system preferably also includes a frequency synthesizer connected to the first and second optical signal sources to provide modulating signals thereto.

An appreciation of the objectives of the present invention and a more complete understanding of its structure and method of operation may be had by studying the following description of the preferred embodiment and by referring to the accompanying drawings.

DESCRIPTION OF THE PREFERRED EMBODIMENT

Figure 1:
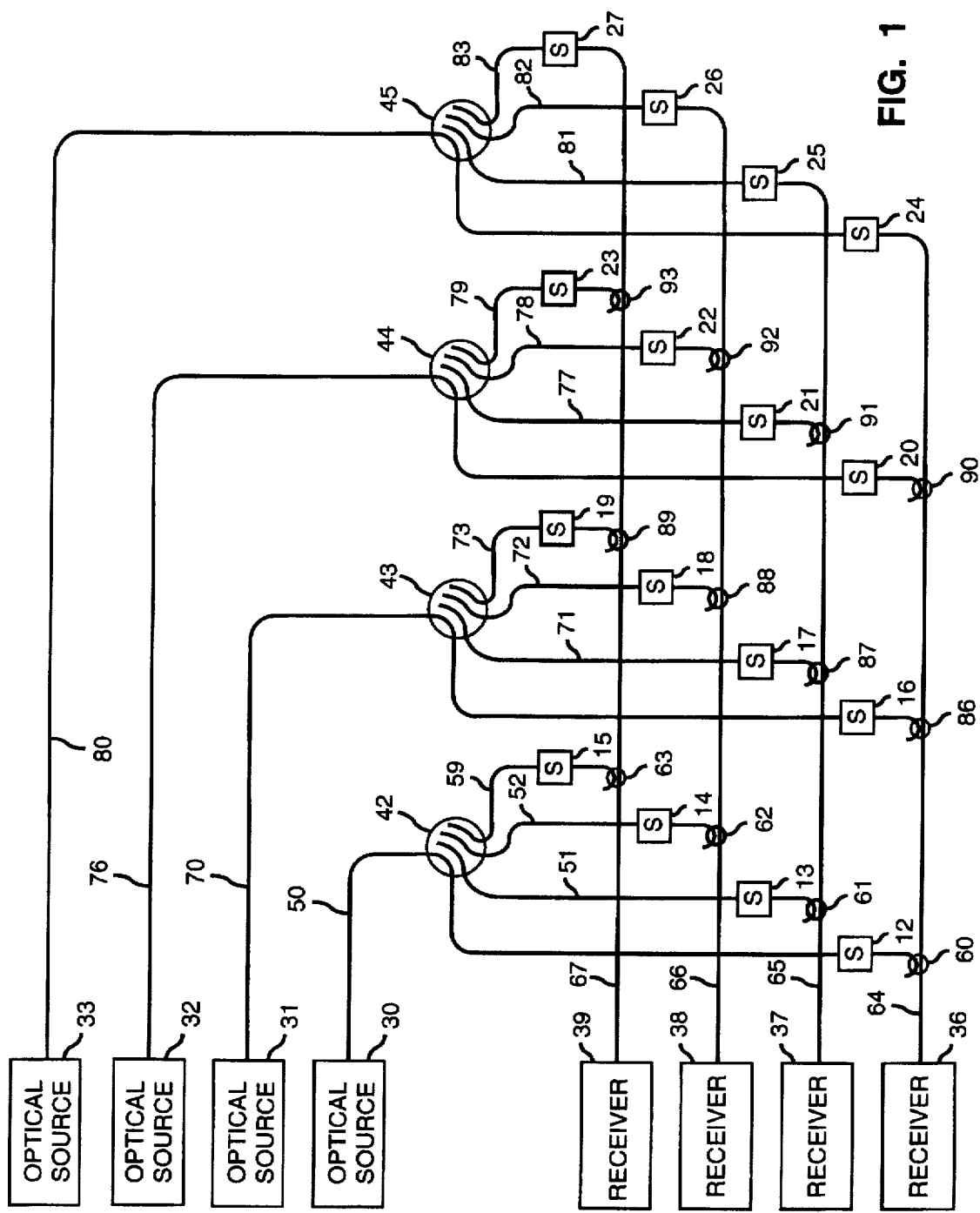
FIG. 1 is a block diagram illustrating a prior art frequency division multiplexing fiber optic sensor system.

A prior art fiber optic sensor telemetry array 10 that employs frequency division multiplexing is shown in FIG. 1. The array 10 includes sixteen fiber optic sensors 12–27, four optical signal sources 30–33, four receivers 36–39 and four optical couplers 42–45.

The optical signal source 30 provides optical signals to the fiber optic coupler 42 via an optical fiber 50. The fiber optic coupler 42 divides the input optical signal between the optical fiber 50 and three additional optical fibers 51–53. The fiber optic coupler 42 preferably is a 1:4 coupler such that each signal output via the optical fibers 50–53 has an intensity that is one-fourth of the input signal intensity.

The optical fibers 50–53 deliver optical signals to the fiber optic sensors 12–15, respectively. The fiber optic sensors 12–15 preferably are interferometric sensors such as Mach-Zehnder or Michelson interferometers (not shown). Such interferometric sensors are well-known in the art. Basically they include two optical paths formed to have differing length changes in response to changes in a physical parameter being sensed. The differential length changes produce changes in the interference patterns output from the sensors. These changes in interference pattern may be detected and processed to measure changes in the parameter being measured.

The signals output from the sensors 12–15 are input to fiber optic return telemetry couplers 60–63, respectively. The fiber optic-return telemetry couplers 60–63 couple part of the sensor outputs into optical fibers 64–67 that deliver their respective signals to the receivers 36–39, respectively.

The optical signal source 31 delivers optical signals to an optical fiber 70 that is connected to the fiber optic coupler 43, which divides the input signals between the optical fiber 70 and three other optical fibers 71–73. The optical fibers 70–73 provide optical signals to the sensors 16–19, which provide sensor output signals to the return fibers 64–67, respectively, via corresponding fiber optic return telemetry couplers 86–89.

Similarly, the optical signal source 32 delivers optical signals to an optical fiber 76 that is connected to the fiber optic coupler 44, which divides the input signals between the optical fiber 76 and three other optical fibers 77–79. The optical fibers 77–79 provide optical signals to the sensors 20–23, which provide sensor output signals to the return fibers 64–67, respectively, via corresponding fiber optic return telemetry couplers 90–93.

The optical signal source 33 delivers optical signals to an optical fiber 80 that is connected to the fiber optic coupler 45, which divides the input signals between the optical fiber 80 and three other optical fibers 81–83. The optical fibers 70–73 provide optical signals to the sensors 24–27, which provide sensor output signals directly to the return fibers 64–67. Depending upon the structures of the sensors 24–27, the return fibers 64–67 may be continuous with the optical fibers 80–83.

The fiber optic return telemetry couplers that connect the sensors to the return optical fiber 64–67 are reciprocal couplers, meaning that if a certain fraction, k, of the output optical power of one of the sensor is coupled onto one of the telemetry lines 64–67, the same fraction of optical power already present on the telemetry line from other sensors is lost (i.e. coupled off the telemetry line). Therefore, if the return telemetry couplers are all identical (which is usually desirable to minimize costs) a sensor signal couples a fraction k of its light onto the telemetry line, and this is attenuated by a factor of $(1-k)^n$ by the n couplers that follow it. The worst case is the sensor farthest from the receiver. In a telemetry line with N sensors and N telemetry couplers of coupling coefficient k on it. The telemetry scheme returns only $k[(1-k)^{(N-1)}]$ of its output optical power to the receiver.

For a given value of N (i.e. a certain number of sensors and couplers on a return line), the optimum value of the telemetry coupler coupling coefficient is 1/N. This returns the most power from the last, dimmest sensor. Obviously, the more sensors one taps onto the line, the less power one returns from the sensors.

Figure 2:
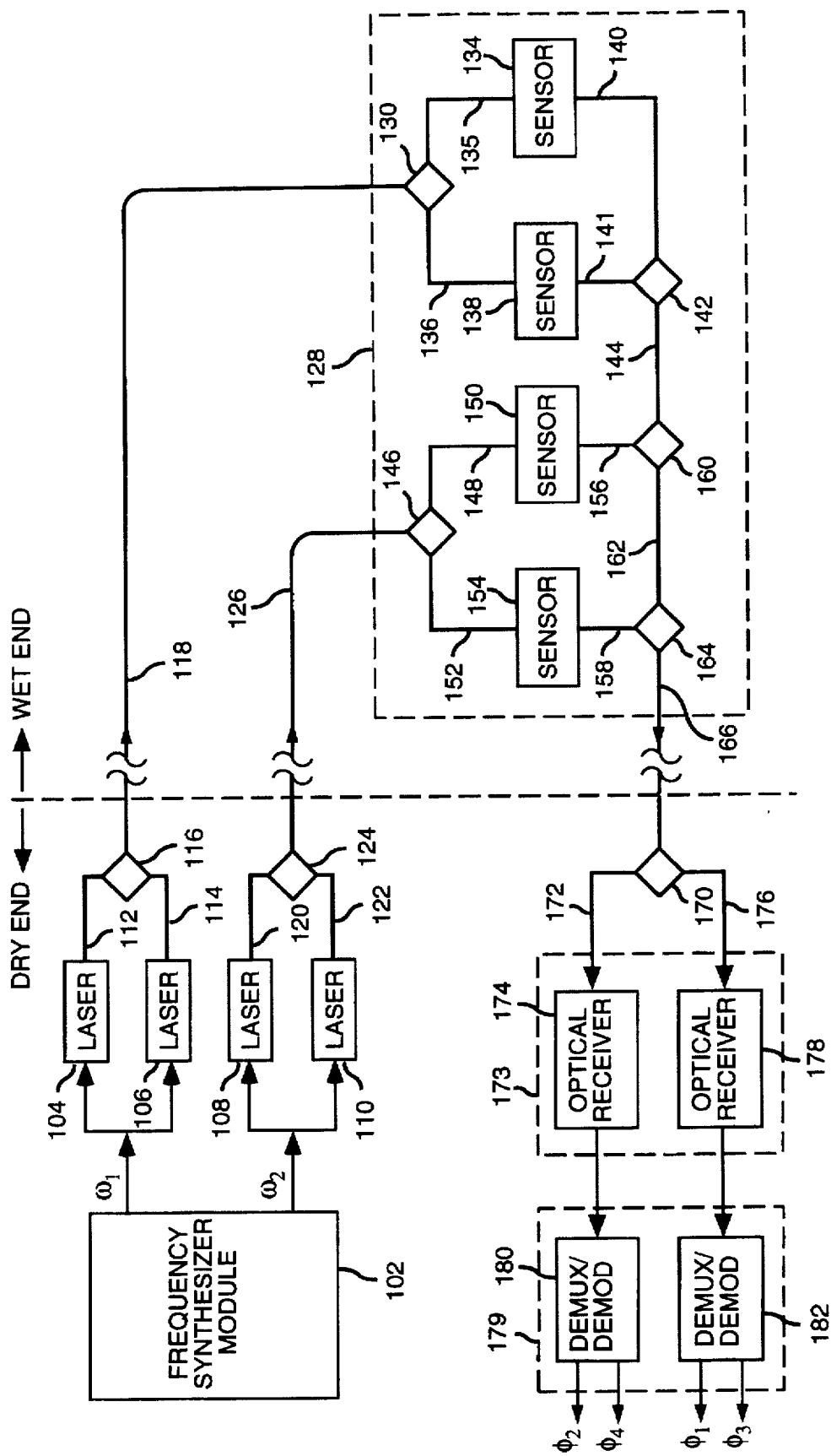
FIG. 2 is a block diagram of a multiplexed fiber optic sensor system according to the invention.

FIG. 2 illustrates is a simple sensor system 100 according to the invention. The sensor system 100 employs both frequency division multiplexing (FDM) and wavelength division multiplexing (WDM).

A frequency synthesizer module 102 produces signals of frequencies $\omega_1$ and $\omega_2$. The signal having frequency $\omega_1$ is input to a pair of lasers 104 and 106. As am example, the laser 104 can produce an output optical signal having a wavelength of 1310 nm, and the laser 106 can produce an output optical signal having a wavelength of 1550 nm. The signal having frequency $\omega_2$ is input to a pair of lasers 108 and 110. The laser 108 can produce an output optical signal having a wavelength of 1310 nm, and the laser 110 produces an output optical signal having a wavelength of 1550 nm.

The signals output from the laser 104 are input to an optical fiber 112, and the signals output from the laser 106 are input to an optical fiber 114. The optical fibers 112 and 114 deliver their signals to a wavelength division multiplexing fiber optic coupler 116, which couples the signals having the wavelengths 1310 nm and 1550 nm to an optical fiber 118.

The signals output from the laser 108 are input to an optical fiber 120, and the signals output from the laser 110 are input to an optical fiber 122. The optical fibers 120 and 122 deliver their signals to a wavelength division multiplexing fiber optic coupler 124, which couples the signals having the wavelengths 1310 nm and 1550 nm to an optical fiber 126.

The optical fiber 118 provides the combined signals of the two wavelengths to a wavelength division multiplexing (WDM) coupler 130. The WDM coupler 130 provides a first coupler output signal having a wavelength of 1310 nm to an optical fiber 135 which carries the signal to a sensor 134. The WDM coupler 130 provides a second coupler output signal having a wavelength of 1550 nm to an optical fiber 136 which carries the signal to a sensor 138. Optical fibers 140 and 141 guide signals output from the sensors 134 and 138, respectively to a WDM fiber optic coupler 142. The WDM coupler 142 combines the signals guided by the optical fibers 140 and 141 onto an optical fiber 144.

The optical fiber 126 provides the combined signals of the two wavelengths to a wavelength division multiplexing (WDM) coupler 146. The WDM coupler 146 provides a first coupler output signal having a wavelength of 1310 nm to an optical fiber 148 which carries the signal to a sensor 150. The WDM coupler 146 provides a second coupler output signal having a wavelength of 1550 nm to an optical fiber 152 which carries the signal to a sensor 154. An optical fiber 156 guides signals output from the sensor 150 to a WDM fiber optic coupler 160 that is also connected to the optical fiber 144. The WDM fiber optic coupler 160 combines the signals guided by the optical fibers 144 and 156 onto an optical fiber 162. An optical fiber 158 guides signals output from the sensor 154 to a WDM fiber optic coupler 164 that is also connected to the optical fiber 162. The WDM coupler 164 combines the signals guided by the optical fibers 162 and 158 onto a single return optical fiber 166.

The return optical fiber 166 guides the combined sensor signals to a WDM fiber optic coupler 170. Signals having a wavelength of 1310 nm are output from the WDM fiber optic coupler 170 to an optical fiber 172, which guides signals of this first wavelength to an optical receiver assembly that includes a pair of optical receivers 174 and 178. Signals having a wavelength of 1550 nm are output from the WDM fiber optic coupler 170 to an optical fiber 176, which guides signals of this first wavelength to the optical receiver 178. The optical receivers 174 and 178 are connected to a demultiplexer/demodulator assembly 179 that includes a pair of essentially identical demultiplexer/demodulators 180 and 182. The demultiplexer/demodulators 180 and 182 provide signals $\phi_1$ through $\phi_4$ that are indicative of the phase changes experienced by the optical signals in the four sensors 134, 138, 150 and 154.

Using both FDM and WDM allows interrogation of more sensors with fewer telemetry lines than is possible with previous sensor architectures. In WDM two or more optical wavelengths are combined onto a single fiber. Each optical wavelength is sometimes referred to as a "color." The optical wavelengths are transmitted to the sensor array 128, where they are separated and sent to different sensors as described above with reference to FIG. 2. The optical wavelengths are then recombined onto the single return fiber 166 for transmission back to the receiver. The number of sensors serviced with a given number of FDM telemetry fibers can be doubled by manipulating two colors in this fashion.

FIG. 2 shows optical signal wavelengths of 1.31 and 1.55 microns being multiplexed in this way. The choice of colors (or wavelengths) to use is, in many cases, dictated by the need to employ optical amplification to produce a signal of satisfactory signal strength. Present optical amplifiers are based upon erbium-doped fibers that provide amplification of optical signals in a range from about 1.53 microns to about 1.56 microns. Using an erbium-based amplifier requires that both colors must fall in the available gain bandwidth of erbium-based optical amplifiers. Present fiber optic coupler technology limits one to efficient use of only two or three colors when the total spectrum of colors used is so narrow.

Wavelength dependent fiber optic couplers are used at several positions in the array 128. The most widely used, standard type of these WDM couplers exhibit 100% exchange of energy between fibers for light at one wavelength, and 0% coupling at the second wavelength. Thus, light from laser beams of two different colors entering the coupler on two different input fibers leaves the coupler on one fiber. Optical signals of two different colors incident upon a WDM coupler in one fiber are output in two separate fibers with only one color being in each fiber. The WDM couplers 130 and 146 are also used just forward of the sensors 134, 138 and 150, 154, respectively, in the array 128 to distribute the different colors between different sensors, and just ahead of the receiver, to send different-colored signals to different demodulation channels. The wavelength dependent couplers 142, 160 and 164 used to combine signals on the telemetry line 166 should, optimally, behave differently than these typical WDM couplers, according to the specifications of the present invention.

In the system illustrated in FIG. 2, four sensors 134, 138, 150 and 154 are multiplexed onto the return line 166. The way to accomplish this using the teachings of the prior art is to use wavelength independent couplers that couple a certain fraction of energy at both wavelengths. Because the two wavelengths 1310 nm and 1550 nm are within 1% of a nominal center wavelength, this is easy to do. The operating bandwidth, encompassing both multiplexed wavelengths commonly falls within the performance specifications of commercial single-wavelength couplers so that identical coupling at both wavelengths is easily achieved. According to the considerations of the FDM telemetry described above, the optimum coupling ratio for these four return telemetry couplers is ¼=25%. In general, the optimum coupling ratio is that which returns the most power from the aftmost sensor. With N sensors and N identical telemetry tap couplers, this optimum is power coupling ratio is 1/N (i.e. 1/N is the value of k that provides the greatest value of $k[(1-k)^{(N-1)}]$ for a given number of sensors, N for two-color FDM/WDM sensor arrays.

The combination of WDM and FDM described herein allows us to approach the specifications of many towed array systems with the simplest extrapolation of proven hardware. The goals of the large scale towed array telemetry designs are: (1) to meet all performance specifications (e.g. crosstalk, noise floor, reliability), (2) minimize the array diameter, and (3) to maintain as much interchangeability of array modules as possible.

Inclusion of WDM techniques provides more flexibility in implementing large systems. Wavelength dependent couplers can be used to combine laser signals of two wavelengths (e.g. 1.3 and 1.5 microns) onto a single fiber and separate them again downstream. The number of telemetry lines required can be decreased by as much as half.

This WDM/FDM strategy also provides some relief in the optical power budget of a comparably sized FDM system. Separating the two wavelengths before they arrive at the optical receivers reduces the shot noise at the detectors, which derives increased performance from lower power optical sources. The telemetry also requires reciprocal coupling of fewer sensors onto the return bus, which provides lower transmission loss of these signals.

The optical sources are narrow linewidth, single frequency lasers that operate near wavelengths of 1.319 and 1.535 microns. The 1.319 micron lasers preferably are diode-pumped Nd:YAG lasers produced by Lightwave Electronics. The 1.5 micron sources are preferably EDFL sources manufactured by Litton Industries. The Litton EDFL provides in excess of 40 mW in a fiber pigtail, with a linewidth (in 10 msec) of less than 20 kHz. These frequency stabilities are sufficient to suppress the laser-induced phase noise of the sensors to at least an order of magnitude below the level of shot noise expected in the system.

These lasers are preferably externally phase modulated with lithium niobate electrooptic phase modulators available from United Technologies Photonics. These modulators have been tested at a 1.3 and 1.5 micron wavelengths and found to perform well with over 170 milliwatts of optical power.

Wavelength division multiplexers are integrated fiber devices and are available commercially from many vendors. Typically they display near 100% coupling at one wavelength, and near zero coupling at another. The most critical aspect of their performance is the demultiplexing function they perform in the array 128. In order to suppress crosstalk, the couplers 130 and 146 must cleanly separate the two wavelengths that are to illuminate different sensor groups in the array 128. In the event that sufficient wavelength isolation cannot be achieved or maintained over the environments seen by the array, it may be necessary to cascade WDM couplers at the inputs to the sensors 134, 136, 150 and 154, at a small (<0.5 dB) cost in optical power. Reflective filters can also be used to prevent transmission of unwanted wavelengths. The crosstalk isolation provided by the demultiplexing WDM coupler 170 shown at the optical receiver can be enhanced by using different modulation carrier frequencies with the different wavelength lasers, so their demultiplexing isolation is not as critical.

At three positions in the sensor system 100, WDM couplers 142, 160 and 164 perform a multiplexing function by combining two wavelengths onto a single fiber. Less than optimum isolation in performing this function results only in a small excess loss. The couplers 142, 163 and 164 on the return bus 166 preferably are designed specifically for this application in FDM/WDM sensor arrays. The coupling ratio of the coupled wavelength must be tailored for return coupling of sensors of a given array size, while maintaining near zero coupling for the other wavelength.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A fiber optic sensor system, comprising:
   a frequency synthesizer that produces a pair of modulating signals having frequencies $\omega_1$ and $\omega_2$;

a first pair of optical signal sources that produce optical signals having wavelengths $\lambda_1$ and $\lambda_2$ connected to the frequency synthesizer to receive modulating signals having frequency $\omega_1$;

a first WDM coupler connected to the first pair of optical signal sources to combine signals output therefrom;

a first optical fiber connected to the first WDM coupler to guide optical signals therefrom;

a second WDM coupler connected to the first optical fiber to separate the first pair of optical signals;

a first fiber optic sensor array containing a plurality of fiber optic sensors connected to the second WDM coupler and arranged such that optical signals of the wavelengths $\lambda_1$ and $\lambda_2$ are directed to different fiber optic sensors in the first fiber optic sensor array;

a second pair of optical signal sources that produce optical signals having wavelengths $\lambda_1$ and $\lambda_2$ connected to the frequency synthesizer to receive modulating signals having frequency $\omega_2$;

a third WDM coupler connected to the second pair of optical signal sources to combine signals output therefrom;

a second optical fiber connected to the third WDM coupler to guide optical signals therefrom;

a fourth WDM coupler connected to the second optical fiber to separate the second pair of optical signals;

a second fiber optic sensor array containing a plurality of fiber optic sensors connected to the fourth WDM coupler and arranged such that optical signals of the wavelengths $\lambda_1$ and $\lambda_2$ are directed to different fiber optic sensors in the second fiber optic sensor array;

WDM coupler means connected to the first and second fiber optic sensor arrays to combine optical signals output therefrom;

FDM apparatus connected to the WDM coupler means for guiding the combined optical signals output from the WDM coupler means; and demultiplexing and demodulating apparatus for producing signals that correspond to the fiber optic sensors.

2. The fiber optic sensor system of claim 1 wherein the first, second and third WDM couplers are formed to provide 100% exchange of optical signals between optical fibers at a first wavelength and 0% coupling at a second wavelength.

3. The fiber optic sensor system of claim 1, further including a frequency synthesizer connected to the first and second optical signal sources to provide modulating signals thereto.

4. A fiber optic sensor system, comprising:

a first optical signal source for providing an optical signal of a plurality of wavelengths;

a first optical fiber arranged to receive optical signals from the optical signal source;

a first wavelength dependent demultiplexing fiber optic coupler connected to the first optical fiber to receive as the optical signal therefrom, the first wavelength dependent fiber optic coupler being arranged to separate the optical signal from the optical signal source into a plurality of single wavelength optical signals;

a first plurality of optical fibers connected to the first wavelength dependent fiber optic coupler to guide the single wavelength optical signals to a first group of the fiber optic sensors;

a first wavelength dependent multiplexing fiber optic coupler connected to each of the first group of fiber optic sensors and arranged to receive sensor output signals therefrom;

a return fiber optic bus connected to the first wavelength dependent multiplexing fiber optic coupler to receive the sensor output signals;

a second optical fiber arranged to receive optical signals from the optical signal source;

a second wavelength dependent demultiplexing fiber optic coupler connected to the second optical fiber to receive as the optical signal therefrom, the second wavelength dependent fiber optic coupler being arranged to separate the optical signal from the optical signal source into a plurality of single wavelength optical signals;

a second plurality of optical fibers connected to the second wavelength dependent fiber optic coupler to guide the single wavelength optical signals to a second group of the fiber optic sensors;

a second multiplexing fiber optic coupler connected between a first one of the second group of fiber optic sensors and the return line for combining sensor output signals from the first one of the second group of fiber optic sensors with sensor signals output from the first wavelength dependent multiplexing fiber optic coupler;

a third wavelength dependent multiplexing fiber optic coupler connected between a second one of the second group of fiber optic sensors and the second wavelength dependent multiplexing fiber optic coupler, the third wavelength dependent multiplexing fiber optic coupler being arranged to combine sensor output signals from all the sensors onto the single return fiber optic bus;

a third wavelength dependent demultiplexing fiber optic coupler connected to the single return optical fiber bus to receive the combined sensor signals therefrom, the third wavelength dependent fiber optic coupler being arranged to separate the combined sensor signals into a plurality of single wavelength optical output signals;

an optical receiver module connected to the third wavelength dependent demultiplexing fiber optic coupler to receive the plurality of single wavelength optical output signals, the optical receiver module being arranged to produce a separate electrical signal corresponding to each one of the plurality of single wavelength optical output signals; and a demultiplexer/demodulator module connected to the optical receiver module for separating signals output therefrom into a plurality of signals $\phi_1, \phi_2, \ldots \phi_N$ that correspond to the plurality of fiber optic sensors.

5. The fiber optic sensor system of claim 4 wherein the first, second and third WDM couplers are formed to provide 100% exchange of optical signals between optical fibers at a first wavelength and 0% coupling at a second wavelength.

* * * * *